(12) United States Patent
Hofmann

(10) Patent No.: US 10,981,317 B2
(45) Date of Patent: Apr. 20, 2021

(54) DEVICE FOR PRODUCING PLASTIC PIPES

(71) Applicant: Unicor GmbH, Hassfurt (DE)

(72) Inventor: Günther Hofmann, Hassfurt-Augsfeld (DE)

(73) Assignee: Unicor GmbH

( * ) Notice: Subject to any disclaimer, the term of this patent is extended or adjusted under 35 U.S.C. 154(b) by 317 days.

(21) Appl. No.: 15/760,729

(22) PCT Filed: Sep. 16, 2016

(86) PCT No.: PCT/EP2016/072037
§ 371 (c)(1),
(2) Date: Mar. 16, 2018

(87) PCT Pub. No.: WO2017/046368
PCT Pub. Date: Mar. 23, 2017

(65) Prior Publication Data
US 2018/0272591 A1    Sep. 27, 2018

(30) Foreign Application Priority Data

Sep. 18, 2015    (DE) ..................... 10 2015 115 827.2

(51) Int. Cl.
| | | |
|---|---|---|
| *B29C 48/13* | (2019.01) | |
| *B29C 48/25* | (2019.01) | |
| *B29C 48/92* | (2019.01) | |
| *B29C 48/30* | (2019.01) | |
| *B29C 48/09* | (2019.01) | |
| *B29L 23/00* | (2006.01) | |

(52) U.S. Cl.
CPC ............ *B29C 48/266* (2019.02); *B29C 48/09* (2019.02); *B29C 48/13* (2019.02); *B29C 48/303* (2019.02);
(Continued)

(58) Field of Classification Search
CPC ....... B29C 48/266; B29C 48/13; B29C 48/30; B29C 48/92; B29C 48/303; B29C 48/32;
(Continued)

(56) References Cited

U.S. PATENT DOCUMENTS

| | | |
|---|---|---|
| 4,504,206 A | 3/1985 | Lupke et al. |
| 4,633,699 A | 1/1987 | Fuchs, Jr. |

(Continued)

FOREIGN PATENT DOCUMENTS

| | | | |
|---|---|---|---|
| CA | 0087854 A1 | * | 9/1983 |
| DE | 19956880 A1 | | 5/2001 |

(Continued)

OTHER PUBLICATIONS

German Examination Report for Application No. 102015115827.2 dated Jun. 17, 2016.
(Continued)

*Primary Examiner* — Xiao S Zhao
*Assistant Examiner* — Ninh V Le
(74) *Attorney, Agent, or Firm* — Lerner, David, Littenberg, Krumholz & Mentlik, LLP

(57) ABSTRACT

A device for producing plastic pipes may include an extruder with a die head and a corrugator, into which a molten plastic tube is introduced by means of the die head to mold the plastic pipe. The corrugator has a molding section, in which molding jaws are guided in pairs in the production direction; in an inlet section of the corrugator, the molding jaws are brought together to form molding jaw pairs towards the start of the molding section; and in an outlet section of the corrugator, the molding jaw pairs are moved apart from each other from the end of the molding section. Each molding jaw has a first and second guide pins and the molding jaws are guided in the guiding apparatus in that the first and second guide pins engage, with respective free ends, in first and second guide grooves of the guiding apparatus.

7 Claims, 4 Drawing Sheets

Figure 1:
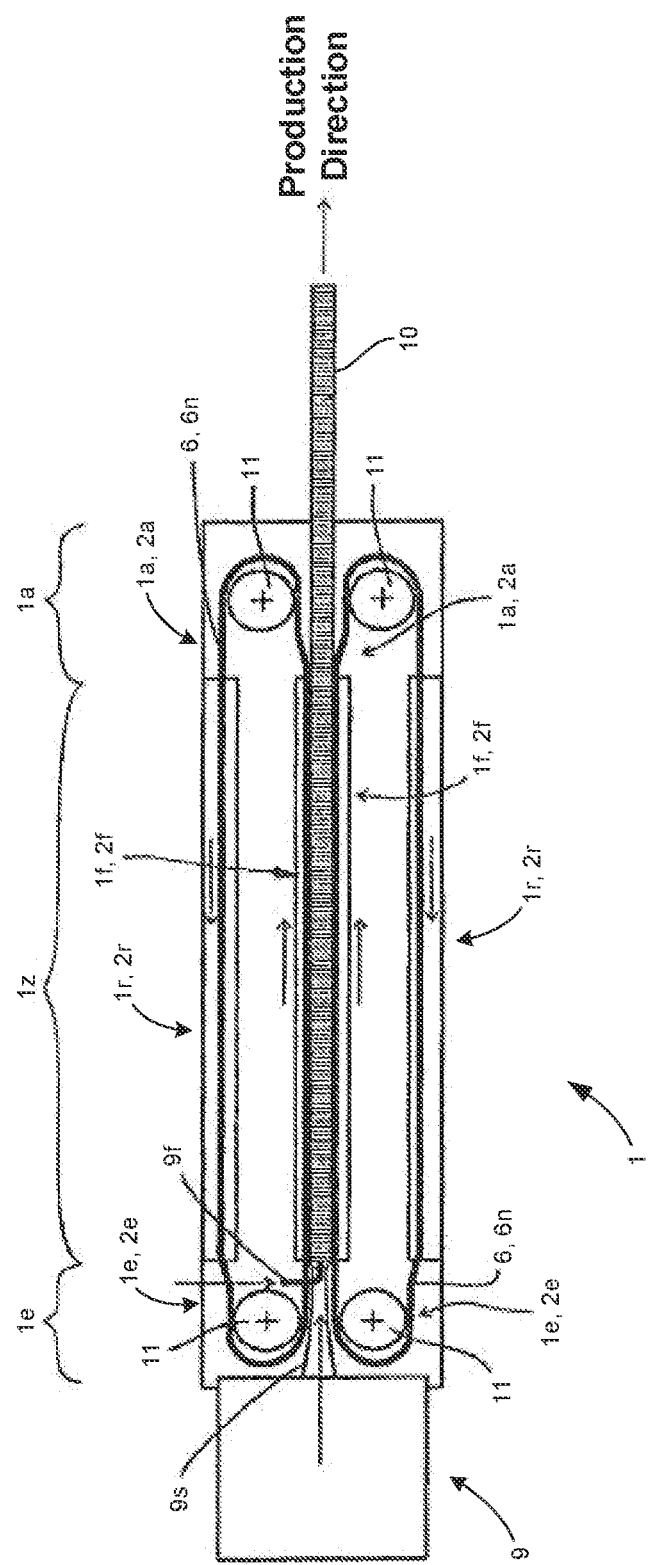

(52) U.S. Cl.
CPC .... *B29C 48/92* (2019.02); *B29C 2948/92571* (2019.02); *B29C 2948/92704* (2019.02); *B29C 2948/92923* (2019.02); *B29L 2023/22* (2013.01)

(58) Field of Classification Search
CPC ............... B29C 48/325; B29C 48/9115; B29C 48/0017; B29C 48/09; B29C 49/38; B29C 49/0021; B29C 49/4823; B29C 33/36; B29L 2023/00; B29L 2023/18; B29L 2023/22
See application file for complete search history.

(56) References Cited

U.S. PATENT DOCUMENTS

| | | | |
|---|---|---|---|
| 4,681,526 | A | 7/1987 | Lupke |
| 7,153,117 | B2 | 12/2006 | Hofmann |

FOREIGN PATENT DOCUMENTS

| | | |
|---|---|---|
| DE | 102008021237 A1 | 10/2009 |
| DE | 102008023178 A1 | 11/2009 |
| EP | 1897671 A1 | 3/2008 |
| FR | 2240094 A2 | 3/1975 |
| KR | 100333015 B1 | 11/2002 |
| WO | 9106419 A1 | 5/1991 |
| WO | 2004052624 A1 | 6/2004 |

OTHER PUBLICATIONS

International Search Report for Application No. PCT/EP2016/072037 dated Dec. 20, 2016.
Indian Examination Report for Application No. 201827009864 dated Jul. 2, 2020; 6 pages.

* cited by examiner

DEVICE FOR PRODUCING PLASTIC PIPES

CROSS REFERENCE TO RELATED APPLICATIONS

The present application is a national phase entry under 35 U.S.C. § 371 of International Application No. PCT/EP2016/072037 filed Sep. 16, 2016, which claims the priority from German Patent Application No. 10 2015 115 827.2, filed on Sep. 18, 2015, the entire contents of which are hereby incorporated by reference.

The invention relates to a device for producing plastic pipes according to the preamble of claim 1.

Such a device for producing plastic pipes is described e.g. in WO 2004/052 624 A1. The device has an extruder with a die head, and a corrugator, into which a molten plastic tube is introduced by means of the die head in order to mold the plastic pipe. The corrugator has a molding section, in which molding jaws are guided in pairs in the production direction/guiding direction. In an inlet section of the corrugator, the molding jaws are brought together to form molding jaw pairs towards the start of the molding section. In an outlet section of the corrugator, the molding jaw pairs are moved apart from each other from the end of the molding section. In an intermediate section of the corrugator arranged between the inlet section and the outlet section, the molding section is formed to guide the molding jaw pairs and a return guide is formed in which the molding jaws are returned from the end of the molding section to the start of the molding section.

Such a device for producing corrugated plastic pipes is also known from DE 10 2008 021 237 A1.

From U.S. Pat. No. 4,633,699 a system for producing a long cable is known, wherein curved rail-like sections of the outer and inner walls of the molding section engage in grooves on the top side and underside of the molding jaws and the molding jaws are guided thereby.

Devices for producing plastic pipes with molding jaws which have rotatably mounted rollers which engage in a common groove to guide the molding jaws are already known. The size of the bearings and the rollers does not make such a guidance readily possible in the case of molding jaws for plastic pipes with a small diameter of up to 75 mm.

The object of the present invention is to specify a device for producing plastic pipes which is improved with respect to the guidance of the molding jaws.

According to the invention this object is achieved with the subject-matter of claim 1. The solution is a device for producing plastic pipes, with an extruder with a die head and a corrugator, into which a molten plastic tube is introduced by means of the die head in order to mold the plastic pipe. It is provided that the corrugator has a molding section, in which molding jaws are guided in pairs in the production direction.

It is furthermore provided that, in an inlet section of the corrugator, the molding jaws are brought together to form molding jaw pairs towards the start of the molding section.

The device provides that, in an outlet section of the corrugator, the molding jaw pairs are moved apart from each other from the end of the molding section.

Furthermore such a device provides that, in an intermediate section of the corrugator arranged between the inlet section and the outlet section, the molding section is formed to guide the molding jaw pairs and a return guide is formed in which the molding jaws are returned from the end of the molding section to the start of the molding section.

The solution provides a stationary guiding apparatus for guiding the molding jaws.

It is important here that each molding jaw has a first guide pin and a second guide pin and the molding jaws are guided in the guiding apparatus in that the first guide pin engages, with its free end, in a first guide groove of the guiding apparatus and the second guide pin engages, with its free end, in a second guide groove of the guiding apparatus.

The guiding apparatus with the guide pins, which preferably engage directly in the guide grooves with their free ends, can be designed constructively particularly simple and compact.

With regard to the design of the guide pin, it can be provided that the first guide pin and/or the second guide pin is/are in each case formed as a one-piece guide pin or as a multi-part guide pin, preferably composed of several pin shaped parts.

A particularly good guidance results with embodiments which provide that the first guide pin and/or the second guide pin is/are in each case formed such that the free end of the guide pin engaging in the guide groove is formed as an immovable part of the guide pin.

Constructively particularly simple solutions result when it is provided that the first guide pin and/or the second guide pin is/are in each case formed such that the end of the guide pin engaging in the guide groove is formed as a one-piece part of the guide pin.

Particularly advantageous embodiments can provide that the first guide pin and/or the second guide pin is/are in each case formed such that the guide pin is formed hardened at least in the area of its free end.

It can be particularly advantageously provided that the first guide pin and/or the second guide pin is/are in each case formed such that, at least in the area of the free end, the guide pin is formed softer than the guide track of the guide groove.

A particularly simple manufacture and good functioning in operation can be obtained with embodiments which provide that the first guide pin and/or the second guide pin is/are in each case formed such that the guide pin is pressed or welded or screwed into the molding jaw. Embodiments are also possible which provide that the first guide pin and/or the second guide pin is/are in each case formed such that the guide pin is rotatably mounted in the molding jaw by means of a pivot bearing.

A particularly practicable guidance is achieved when it is provided that in each case at least two of the guide pins are arranged on each molding jaw with a distance from each other which is formed along the extent of the molding jaw in the production direction. It can be provided that in each case at least two of the guide pins are arranged on each molding jaw on the same side of the molding jaw or on different sides of the molding jaw, preferably on opposite sides of the molding jaw.

Embodiments are possible which provide that at least one of the molding jaws has at least three or more guide pins.

A particularly simple structure of the guiding apparatus can be obtained with embodiments which provide that the first guide groove and the second guide groove are formed separately from each other at least in a section of the guiding apparatus.

It can be provided that the first guide groove and the second guide groove are formed as a common guide groove (not shown in the figures) at least in a section of the guiding apparatus. In a preferred development it can be provided that the common guide groove has a branching area which is preferably formed as a deflector, preferably as a positioning deflector, which allocates the assigned guide groove respectively to the first guide pin and the second guide pin.

In particularly preferred embodiments it can be provided that the guiding apparatus has a guide and/or temperature-control element apparatus. In a preferred development it can be provided that, in the guide and/or temperature-control surface apparatus of the guide and/or temperature-control element apparatus, guide recesses having elevations and/or depressions and/or flat guide surfaces are formed which interact with corresponding guide recesses and/or guide surfaces of the molding jaws 7 passing through.

It can also be provided that the molding jaws are formed for interaction with the guide recesses of the guide and/or temperature-control element apparatus.

Embodiments can be designed constructively particularly simple and particularly compact which provide that the guide and/or temperature-control element apparatus is formed from several temperature-control elements arranged axially one behind another edge to edge in the guiding direction and/or is formed from several temperature-control elements arranged next to each other transverse to the guiding direction.

Particular compactness and good guiding properties are obtained with embodiments which provide that at least one of the guide depressions and/or of the guide protrusions is formed in the area between two guide and/or temperature-control elements neighboring each other in the transverse direction, i.e. is formed composed by sections of two neighboring guide and/or temperature-control elements.

Alternatively, the guide depressions and/or guide protrusions can also be formed in one piece in each case with only one of the guide and/or temperature-control elements.

Figure 2:
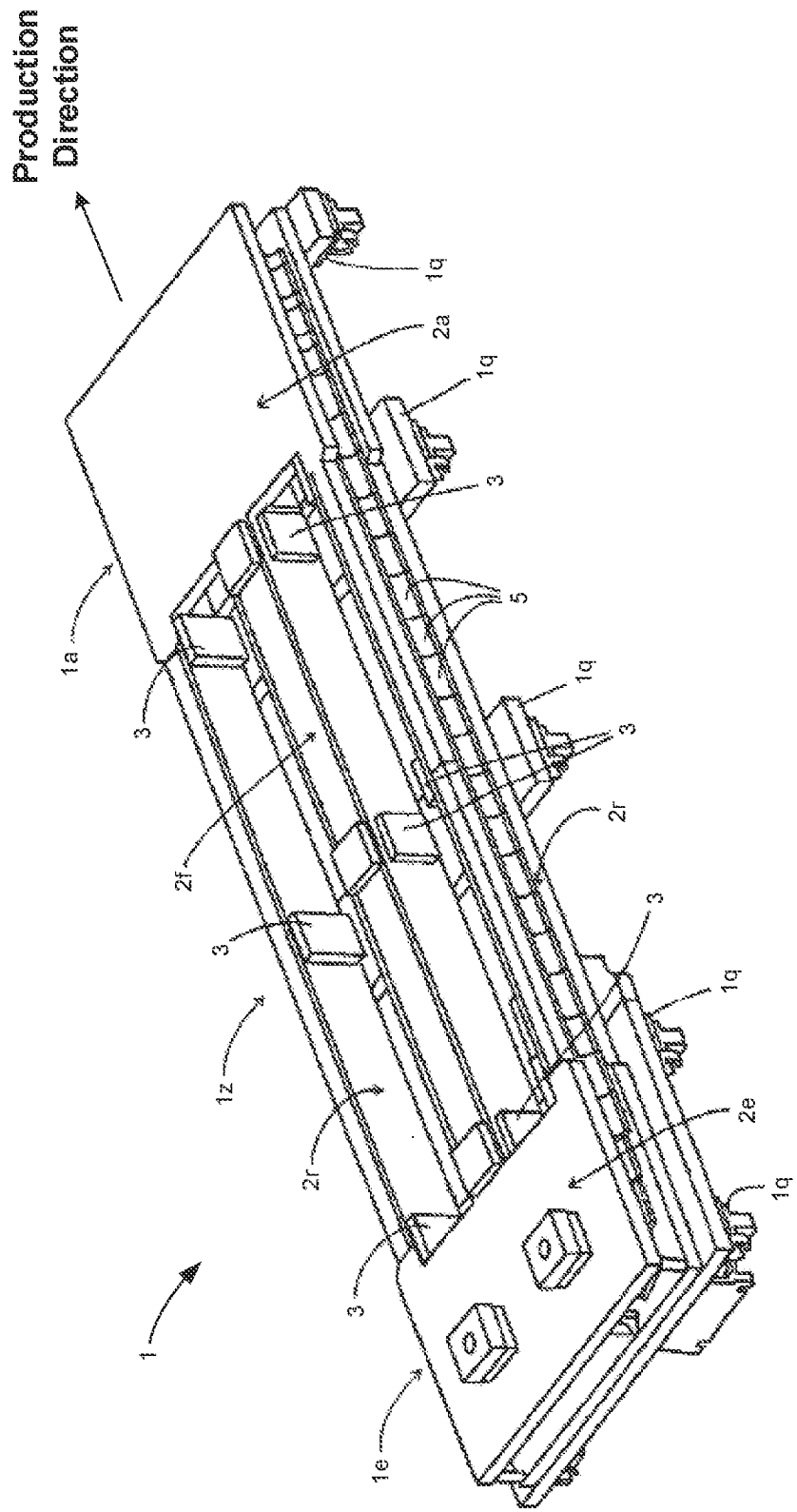
Figure 4:
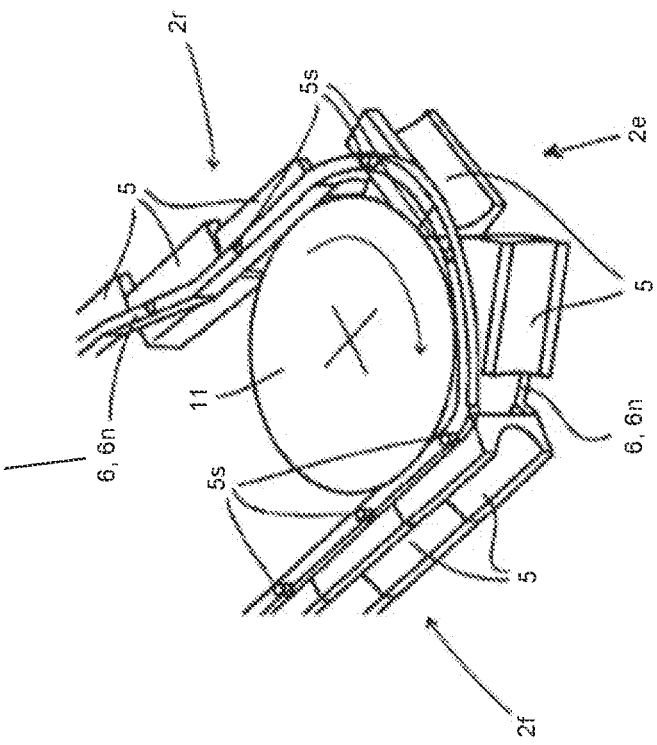
Figure 3:
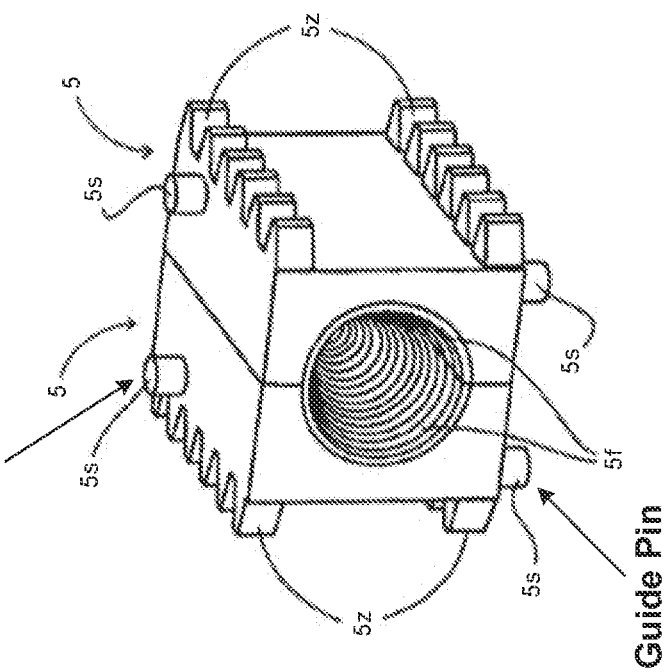
Figure 5:
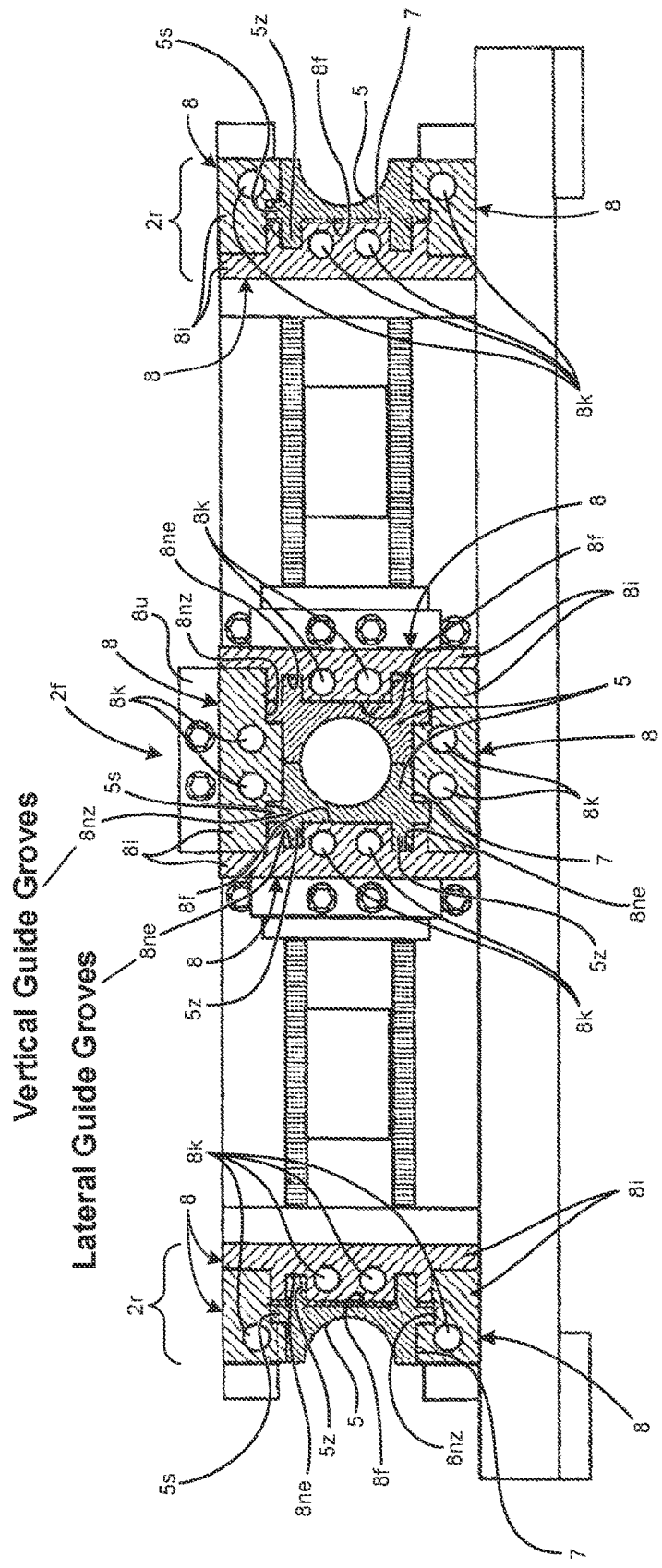
Figure 6:
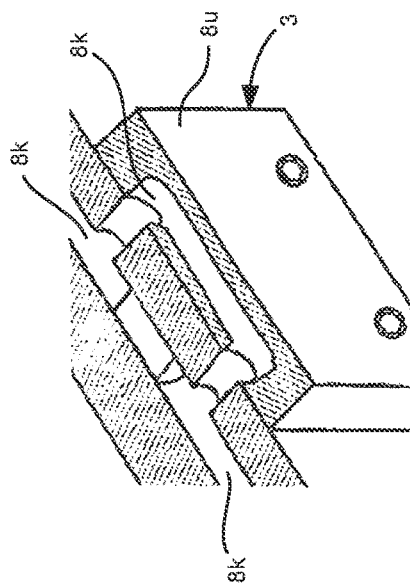

The invention is now explained in more detail with reference to embodiment examples. There are shown in:

FIG. 1 an embodiment example of a device according to the invention for producing plastic pipes in a schematic top view;

FIG. 2 a corrugator of the device in FIG. 1 in a perspective representation;

FIG. 3 a molding jaw pair of the device in FIG. 1 in a perspective representation;

FIG. 4 a detail of an inlet section of the device in FIG. 1 in a perspective representation;

FIG. 5 the intermediate section of the device in FIG. 1 with the molding sections and the return guides in a sectional representation;

FIG. 6 a coupling module with temperature-control medium channel bypass in a perspective sectional representation.

FIG. 1 shows a device for producing plastic pipes 10, with an extruder 9 with a die head 9s and a corrugator 1. A molten plastic tube is introduced into the corrugator by means of the die head 9s in order to mold a plastic pipe 10.

The corrugator 1 has a molding section 1f, in which molding jaws 5 are guided in pairs (see FIG. 3) in the production direction.

In an inlet section 1e of the corrugator 1, the molding jaws 5 are brought together to form molding jaw pairs towards the start of the molding section 1f in an inlet module 2e.

In an outlet section 1a of the corrugator 1, the molding jaw pairs are moved apart from each other from the end of the molding section 1f in an outlet module 2a.

The molding section 1f is formed as a molding section module 2f in an intermediate section 1z of the corrugator 5 arranged between the inlet section 1e and the outlet section 1a. Furthermore, in the intermediate section 1z, on both sides of the molding section 1f, in each case a return guide 1r is formed, namely a return guide 1r for the left-hand molding jaws and a return guide 1r for the right-hand molding jaws. In the return guides 1r, the molding jaws 5 are returned from the end of the molding section 1f to the start of the molding section 1f. The return guides 1r, 1r are formed as two separate return guide modules 2r, 2r. They are arranged parallel to each other. The molding section module 2f is arranged in between.

In the molding section, the molding jaw pairs arranged one behind another lie one on another edge to edge on the end face. A molding jaw pair comprises two molding jaws 5 formed in mirror image, the molding surfaces 5f of which (see FIG. 3) form the negative mold for the plastic pipe 10 formed in the device. To produce corrugated plastic pipes, the molding surfaces 5f are corrugated. The molding surfaces 5f of the molding jaw pairs arranged edge to edge in the molding section 1f form a continuous molding channel.

The extruder g represented only schematically in FIG. 1 has a nozzle-type die head 9s, the outlet opening of which is arranged at the inlet of the molding section. The molten plastic tube is injected into the molding section of the corrugator by means of the die head 9s. By means of corresponding pressure control, the pressures acting on the inner side and on the outer side of the molten plastic tube in the molding section 1f are controlled. Depending on the formation of the nozzle apparatus of the die head 9s, single- and multi-walled plastic pipes can be produced.

The molding jaws 5 are guided in a stationary guiding apparatus 6. As can be recognized in FIGS. 5 and 6 in conjunction with FIG. 2, in the embodiment example represented the guiding apparatus 6 is formed by guide and/or temperature-control element apparatuses 8 which are supported in a fixed manner on cross beams 1q. Temperature-control medium channels 8k through which a temperature-control medium flows are formed in the guide and/or temperature-control element apparatuses 8. The guide and/or temperature-control element apparatuses 8 are composed of guide and/or temperature-control elements 8i. The guide and/or temperature-control elements 8i are arranged such that they enclose the molding jaws 5 passing through from above, from below and from the side. The guide and/or temperature-control elements 8i have guide and/or temperature-control surfaces 8f, sliding against which the molding jaws 5 passing through are guided (see FIG. 5). The guide and/or temperature-control surfaces 8f are formed to complement the outer side of the molding jaws. In the guide and/or temperature-control surfaces 8f, guide grooves 6n, 8nz, 8ne are formed, in which guide pins 5s or, in the case of modified embodiments, other protrusions of the molding jaws 5 engage, the guide grooves comprised of guide recesses having at least one of elevations, depressions, or flat guide surfaces. The guide and/or temperature-control elements 8i thus form temperature-control elements for controlling the temperature of the molding jaws 5 and at the same time they form guide elements, in or against which the molding jaws 5 are guided. The molding surfaces 5f of the molding jaws 5 are temperature-controlled indirectly, i.e. cooled as a rule, by the temperature-control medium, which flows through the temperature-control medium channels 8k of the guide and/or temperature-control elements 8i. However, applications in which the temperature of the temperature-control medium is set such that a heating of the molding jaws is effected by the guide and/or temperature-control element apparatus 8 at least in particular sections of the corrugator are also possible.

FIG. 5 shows a cross section through the intermediate section 1z. The molding section 1f is recognizable in the center and a return guide 1*r* is recognizable on each of the two sides. The guide and/or temperature-control elements 8*i* are formed from elongate base bodies, in each of which two temperature-control medium channels 8*k* are arranged. The temperature-control medium channels 8*k* run along the direction of the longitudinal extent of the guide and/or temperature-control elements 8*i*. A temperature-control medium flows through the temperature-control medium channels 8*k*. The molding jaws 5 pass through the guide and/or temperature-control elements 8*i* along the direction of the longitudinal extent of the guide and/or temperature-control elements 8*i*. The temperature-control medium channels 8*k* extend in the guiding direction.

For guidance and temperature control, the guide and/or temperature-control elements 8*i* interact, as already described, with the molding jaws 5 passing through. For this, the guide and/or temperature-control elements 8*i* have the guide and/or temperature-control surfaces 8*f*, which interact with guide and/or temperature-control surfaces of the molding jaws 5. In the embodiment example represented, the guide and/or temperature-control surfaces 8*f* on the guide and temperature-control element side are formed on the side of the guide and/or temperature-control elements 8*i* facing the assigned molding jaws 5. The guide and/or temperature-control surfaces on the molding jaw side are formed on the outer side of the molding jaws 5. On the side of the molding jaws 5 facing away therefrom, the molding surfaces 5*f* are formed, which are to achieve as uniform as possible a temperature distribution over the entire surface.

As FIG. 5 shows, the guide and/or temperature-control elements 8*i* are formed in the molding section module 2*f* such that the molding jaw pairs are surrounded by the guide and/or temperature-control elements 8*i*. As can be seen from FIG. 5, in the molding section, four guide and/or temperature-control elements 8*i* surround the molding jaw pairs on all four longitudinal sides, in that two lateral guide and/or temperature-control elements 8*i* are in thermal contact with the side surfaces of the molding jaw pairs and two guide and/or temperature-control elements 8*i* are in thermal contact with the top side and, respectively, with the underside of the molding jaw pairs. The guide and/or temperature-control elements 8*i* arranged in the return guide modules 2*r* are formed like the above-named guide and/or temperature-control elements 8*i*, but with the difference that the molding jaws 5 in the return guides 1*r* are enclosed only on three longitudinal sides by the guide and/or temperature-control elements 8*i*, wherein the open sides of the molding jaws 5 have the molding surfaces 5*f*, which are thus not covered.

For the primary guidance of the molding jaws 5, as already described, grooves 8*nz*, 8*ne* are formed in the upper and lower guide and/or temperature-control surfaces 8*f*, in which the upper and lower guide pins 5*s* of the molding jaws 5 engage, in preferred embodiments, the guide pins 5*s* are formed with a diameter smaller than 14 mm. The grooves 8*nz* for guiding the guide pins 5*s* are formed, as represented in FIG. 5, by guide and/or temperature-control elements 8*i* adjoining each other. Furthermore, guide grooves 8*ne* are also formed laterally as one-piece grooves in the guide and/or temperature-control elements 8*i*, in the embodiment example represented, the toothed strips 5*z* of the molding jaws 5 engage in these grooves 8*ne*. A guidance of the molding jaws 5 is also achieved thereby.

The size of the area of contact between the guide and/or temperature-control elements 8*i* and the molding jaws 5 is influenced by these guide structures that engage in each other, i.e. the toothed strips 5*z*, the guide pins 6*n* and/or similar depressions and elevations that further engage in each other, and the heat transfer is at least determined with it.

With reference to FIG. 4, further guide grooves may also be mentioned. These are formed as lower and upper guide grooves 6*n* in the inlet module 2*e* and in the outlet module 2*a*. The guide pins 5*s* of the molding jaws engage in these grooves 6*n*, forming the guidance in the deflection area of the inlet section 1*e* and of the outlet section 1*a*.

The guiding apparatus for guiding the molding jaws is thus a composite apparatus, composed of the guidance through the guide and/or temperature-control element apparatuses 8 (see FIG. 5) and the guidance in the deflection areas in the inlet section 1*e* and in the outlet section 1*a*.

The guide grooves 6*n*, 8*nz*, 8*ne* of the guiding apparatuses 6, 8, 8*i* are formed as endless, i.e. in each case continuous, guide grooves 6*n*, in which the guide pins 5*s* arranged on the molding jaws 5 slide in the sense of an endless circuit. The molding jaws 5 in the case represented each have an upper and a lower guide pin 5*s*, which are arranged on opposite end sections of the molding jaw 5 in each case on the top side and, respectively, on the underside of the molding jaw 5. Accordingly, two upper guide grooves 6*n*, 8*nz*, 8*ne* and two lower guide grooves 6*n*, 8*nz*, 8*ne* are formed in the respective guide and/or temperature-control elements 8*i* and in the deflection area of the inlet and outlet sections 1*e*, 1*a*. The upper and the lower guide grooves have different geometries, wherein the guide grooves are formed such that the molding jaws 5 perform a pivoting movement in curve sections of the guide grooves (see FIG. 4), such as is necessary in the deflection areas of the inlet and outlet sections. Curve abrasion is minimized by the pivoting movement. In the embodiment example represented in FIG. 3, the guide pins 5*s* are rigidly connected to the molding jaws 5, for example by means of a press-fit connection. However, it can also be provided to mount the guide pins 5*s* rotatably, for example in slide bearings, whereby the said curve abrasion is reduced still further.

The molding jaws 5 in the case represented each have two toothed strips 5*z*, which interact in the inlet module 2*e* and in the outlet module 2*a* with deflection pinions 11, as shown in FIG. 4. The teeth are not represented in FIG. 4.

Like FIG. 2, in the embodiment example represented the modules arranged in the intermediate section 1*z*, namely the molding section module 2*f* and the two return guide modules 2*r*, are in each case formed from two partial modules. Plate-shaped coupling apparatuses 3 are provided to connect neighboring modules. The coupling apparatuses 3 are detachably connected to the modules by screw connections. The molding section modules 2*f* are coupled to each other at the end faces by the plate-shaped coupling apparatuses 3. Likewise, the return guide modules 2*r* are coupled to each other at the end faces by coupling apparatuses 3. Coupling apparatuses 3 are likewise arranged in the connecting areas in order to couple the inlet module 2*e* and the outlet module 2*a* to the molding section modules 2*f* and the return guide modules 2*r*.

Temperature-control channel diversions 8*u* are provided in the coupling modules 3 to connect the temperature-control channels 8*k* of neighboring modules. Reference may be made to FIG. 6. The temperature-control channel bypasses 8*u* have U-shaped bypass channels 8*k*, the end sections of which correspond to blind holes which engage perpendicularly through the side wall of the guide and/or temperature-control elements 8*i* of the modules and open into the temperature-control medium channels 8*k*.

The guiding apparatus 6 in the intermediate section 1z is formed, as already described, by the guide and/or temperature-control element apparatus 8. This is arranged on a base frame, as FIGS. 2 and 5 show. The base frame in the case represented in FIG. 2 consists of several base frame parts spaced apart from each other, cross beams 1q in the case represented. The inlet module 2e is arranged on a bearing plate of its own, wherein the bearing plate is supported on two cross beams 1q. The outlet module 2a is arranged on two cross beams 1q that are spaced apart from each other. The inlet module 2e and the outlet module 2a are coupled to a module of the intermediate section 1z in the connecting areas by a cross beam 1q in each case. The modules of the intermediate section 1z are coupled to each other by a cross beam 1q one below another in the connecting areas. The cross beams 1q contain channel connections with U-shaped channels for connecting the temperature-control channels of the modules. In a modified embodiment example, it is also possible for the lower temperature-control channels 8k of the modules to be coupled to each other by coupling apparatuses 3 and for the coupling apparatuses 3 to be arranged on the cross beams 1q.

LIST OF REFERENCE NUMBERS 1 corrugator
1a outlet section
1e inlet section
1f molding section
1r return guide
1q cross beam
1z intermediate section
2a outlet module
2e inlet module
2f molding section module
2r return guide module
3 coupling apparatus
5 molding jaws
5f molding surface
5s guide pins
5z toothed strips
6 stationary guiding apparatus
6n, 8nz, 8ne guide groove;
8 guide and/or temperature-control element apparatus
8i guide and/or temperature-control element
8k temperature-control channel
8u temperature-control channel bypass
8f temperature-control surface
9 extruder
9f molding-air supply
10 plastic pipe
9s die head
11 deflection pinion

The invention claimed is:
1. Device for producing plastic pipes comprising:
an extruder with a die head and a corrugator, into which a molten plastic tube is introduced by means of the die head in order to mold the plastic pipe, wherein the corrugator has a molding section, in which molding jaws are guided in pairs in a production direction,
in an inlet section of the corrugator, the molding jaws are brought together to form molding jaw pairs towards the start of the molding section,
in an outlet section of the corrugator, the molding jaw pairs are moved apart from each other from an end of the molding section, and
in an intermediate section of the corrugator arranged between the inlet section and the outlet section, the molding section is formed to guide the molding jaw pairs and at least one return guide is formed in which the molding jaws are returned from an end of the molding section to the start of the molding section;
a stationary guiding apparatus for guiding the molding jaws,
wherein
a) each of the molding jaws has only a first guide pin and a second guide pin, and the molding jaws are guided in the stationary guiding apparatus in that the first guide pin engages, with a free end of the first guide pin, in a first guide groove of the stationary guiding apparatus and the second guide pin engages, with a free end of the second guide pin, in a second guide groove of the stationary guiding apparatus,
wherein each of the first guide pin and the second guide pin are formed such that
the free end of the guide pin engaging in the respective guide groove is formed as an immovable part of the guide pin and
the guide pin is at least one of pressed, welded or screwed into the molding jaw,
wherein for each molding jaw the two guide pins are arranged with a distance from each other which is formed along the extent of the molding jaw in the production direction, and
wherein in each case the guide pins are arranged on different sides of the molding jaw, on opposite sides of the molding jaw,
b) the stationary guiding apparatus has a guide apparatus and temperature-control element apparatus,
wherein, in a guide and temperature-control surface of the guide apparatus and the temperature-control element apparatus, guide recesses having at least one of elevations, depressions, or flat guide surfaces are formed which interact with at least one of corresponding toothed strips of the molding jaws passing through the guide recesses, and
c) the stationary guiding apparatus for guiding the molding jaws is a composite apparatus providing
guidance through the guide apparatus and the temperature-control element apparatus formed in the intermediate section of the corrugator and
guidance in deflection areas in the inlet section and in the outlet section,
wherein, to form the guidance in the defection area of the inlet section and of the outlet section, lower and upper guide grooves are provided, in which the guide pins of the molding jaws engage, and
wherein, as the first guide pin and the second guide pin, the molding jaws each have an upper and a lower guide pin, which are arranged on opposite end sections of the molding jaw in each case on the top side and, respectively, on the underside of the molding jaw, and the upper and the lower guide grooves have different geometries, wherein guide tracks defined by the upper and lower guide grooves are formed such that the molding jaws perform a pivoting movement in curve sections of the guide tracks, such as is necessary in the deflection areas of the inlet and outlet sections.

2. Device according to claim 1,
wherein
the first guide pin or the second guide pin is in each case formed as a one-piece guide pin or as a multi-part guide pin.

3. Device according to claim 1,
wherein
the first guide pin or the second guide pin is in each case formed such that the free end of the guide pin engaging in the first guide groove or second guide groove is formed as a one-piece part of the at least one guide pin.

4. Device according to claim 1,
wherein
the first guide pin or the second guide pin is in each case formed such that the at least one guide pin is formed hardened at least in an area of the free end of the first guide pin or of the second guide pin.

5. Device according to claim 1,
wherein
the first guide pin or the second guide pin is in each case formed such that, at least in an area of the free end of the first guide pin or of the second guide pin, the at least one guide pin is formed softer than the guide track of the guide groove.

6. Device according to claim 1,
wherein
the first guide groove and the second guide groove are formed separately from each other at least in a section of the stationary guiding apparatus.

7. Device according to claim 1,
wherein
the first guide groove and the second guide groove are formed as a common guide groove at least in a section of the stationary guiding apparatus.

* * * * *